US007865452B2

(12) United States Patent
Boies et al.

(10) Patent No.: US 7,865,452 B2
(45) Date of Patent: *Jan. 4, 2011

(54) SOCIAL KNOWLEDGE SYSTEM CONTENT QUALITY

(75) Inventors: Daniel Boies, St-Lambert (CA); Benoit Dumoulin, St-Lambert (CA); Remi Kwan, Saint-Laurent (CA)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/491,133

(22) Filed: Jun. 24, 2009

(65) Prior Publication Data

US 2009/0276381 A1 Nov. 5, 2009

Related U.S. Application Data

(63) Continuation of application No. 11/583,464, filed on Oct. 18, 2006, now Pat. No. 7,571,145.

(51) Int. Cl.
*G06F 15/18* (2006.01)
(52) U.S. Cl. ....................................................... 706/12
(58) Field of Classification Search .................... 706/12
See application file for complete search history.

(56) References Cited

U.S. PATENT DOCUMENTS

| 6,094,654 | A | 7/2000 | Van Huben et al. |
| 6,161,099 | A | 12/2000 | Harrington et al. |
| 6,431,875 | B1 | 8/2002 | Elliott et al. |
| 6,961,756 | B1 | 11/2005 | Dilsaver et al. |
| 6,983,188 | B2 | 1/2006 | Loughran et al. |
| 7,143,091 | B2 | 11/2006 | Charnock et al. |
| 7,149,724 | B1 | 12/2006 | Flanagan et al. |
| 7,152,045 | B2 | 12/2006 | Hoffman |
| 7,162,433 | B1 | 1/2007 | Foroutan |
| 7,162,458 | B1 | 1/2007 | Flanagan et al. |
| 7,194,442 | B1 | 3/2007 | Flanagan et al. |
| 7,257,767 | B1 | 8/2007 | Carden, Jr. |
| 7,263,655 | B1 | 8/2007 | Carden, Jr. |
| 7,571,145 | B2 * | 8/2009 | Boies et al. ................... 706/20 |

OTHER PUBLICATIONS

Expertise Analysis in a Question Answer Portal for Author Ranking Chen, Lin; Nayak, Richi; Web Intelligence and Intelligent Agent Technology, 2008 IEEE/WIC/ACM International Conference on vol. 1, Dec. 9-12, 2008 pp. 134-140 Digtal Object Identifier 10.1109/WIIAT.2008.12.

(Continued)

*Primary Examiner*—Michael Holmes
(74) *Attorney, Agent, or Firm*—Hickman Palermo Truong & Becker LLP (57) ABSTRACT

Techniques for automatically scoring submissions to an online question-and-answer submission system are disclosed. According to one such technique, an initial set of user submissions are scored by human operators and/or automated algorithmic mechanisms. The submissions and their accompanying scores are provided as training data to an automated machine learning mechanism. The machine learning mechanism processes the training data and automatically detects patterns in the provided submissions. The machine learning mechanism automatically correlates these patterns with the scores assigned to the submissions that match those patterns. As a result, the machine learning mechanism is trained. Thereafter, the machine learning mechanism processes unscored submissions. The machine learning mechanism automatically identifies, from among the patterns that the machine learning mechanism has already detected, one or more patterns that these submissions match. The machine learning mechanism automatically scores these submissions based on the matching patterns and the scores that are associated with those patterns.

20 Claims, 3 Drawing Sheets

OTHER PUBLICATIONS

Yahoo! "Yahoo! Answers", located at http://answers.yahoo.com/best;.sub.—ylt=Au6boeaCHRHAYbTiUsCTPUL..., retrieved on Jan. 15, 2007, copyright 2007, 1 pg.

Yahoo! "Yahoo! Answers", located http://answers.yahoo.com/question/index;.sub.—ylt=AiOh6mzXjnNm58vc..., retrieved on Jan. 15, 2007, copyright 2007, 1 pg.

* cited by examiner

SOCIAL KNOWLEDGE SYSTEM CONTENT QUALITY

CLAIM OF PRIORITY

The present application claims priority under 35 U.S.C. §120 as a continuation of U.S. patent application Ser. No. 11/583,464, titled "IMPROVEMENT OF SOCIAL KNOWLEDGE SYSTEM CONTENT QUALITY," filed Oct. 18, 2006 now U.S. Pat. No. 7,571,145.

FIELD OF THE INVENTION

The present invention relates to machine learning and, more specifically, to a technique for improving the quality of questions and answers submitted through an online question and answer system using machine learning.

BACKGROUND

Yahoo! Answers is an example of a community-based, Internet-accessible question-and-answer submission system that allows users all over the world to submit questions that other users all over the world can view and answer. Users of question-and-answer submission systems submit such questions and answers using an Internet Browser such as Mozilla Firefox. After a user (an "asker") has submitted a question, other users can read the question and, if they choose, submit an answer to the question. Question-and-answer submission systems typically allow users to see, along with a question, answers that have been submitted for that question, and the pseudonyms of the users (the "answerers") who submitted those answers.

Askers and answerers (collectively, "submitters") might be asked to adhere to certain rules and guidelines when submitting questions and answers (collectively, "submissions"), but the open-ended nature of the question-and-answer submission system might not prevent these submitters from submitting submissions that do not follow these rules and guidelines. Unfortunately, where the content of submissions is at least initially unconstrained and unfiltered at the time of submission, at least some of that content is prone to contain abusive, obscene, illegal, or low quality content. Because users of a question-and-answer submission system often believe that they are shielded by some degree of anonymity, and because of the typically impersonal nature of the system, question-and-answer submission systems are especially likely to become corrupted by the submission of such content.

Operators of a question-and-answer submission system typically don't want the content made accessible through the system to include any abusive, obscene, illegal, or low-quality content. When the content of the system includes a high proportion of such unwanted content, people may be less inclined to use the system. Therefore, operators of question-and-answer submission system sometimes attempt to take action against abusive, obscene, illegal, and/or low quality content.

For example, periodically, an operator might examine the submissions that have been submitted to the system since the last time that the operator examined the system's content. The operator might delete, from the system, submissions that are abusive, obscene, illegal, low quality, or that otherwise violate the system's rules and guidelines.

Even where there are many operators frequently examining recent submissions, though, the scale of some question-and-answer submission systems may become so large that even many diligently working operators cannot keep up with the deluge of new submissions. Some unwanted submissions may escape the operators' eyes and pollute the system at least temporarily. Additionally, operators often are unable to perform their services for free, and the limited financial resources of a question-and-answer submission system might preclude the hiring of a quantity of operators sufficient to moderate the system effectively.

Sometimes, by the time that an operator detects abusive, obscene, illegal, and/or low quality content, the content has already been viewed online. Sometimes, the viewing of even a small amount of such content can be highly harmful and can have severe consequences, especially where the viewer is of a tender age. Under some circumstances, the system owners might be found in violation of the law for allowing such material to be accessed online.

To prevent undesirable content from being viewed, operators may configure a system so that new submissions do not become available for viewing until after an operator has reviewed and approved those submissions. Unfortunately, where high quantities of new submissions are being submitted regularly, a backlog of unreviewed submissions can pile up. The rate at which the system's content is refreshed consequently decreases, making the entire system seem stale. When submitters do not see a system update itself in response to submissions, those submitters may come to believe that the system is not functioning properly, and might be disinclined to use the system in the future.

The problems discussed above are not limited to question-and-answer submission systems. The problems discussed above are applicable to many different kinds of online systems in which submitters are allowed to submit user-generated content that becomes accessible by other users of those online systems. Collectively, such online systems may be called "social knowledge systems." For example, the problems discussed above also sometimes plague social knowledge system such as online bulletin board systems and online auction systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, a set of submissions to a question-and-answer submission system are scored or rated based on the content of those submissions. For example, the submissions may be scored or rated by human operators and/or automated algorithmic mechanisms. The scores or ratings may be numeric, or a set of flags, or otherwise. The submissions and their accompanying scores or ratings are then provided as training data to an automated machine learning mechanism. The machine learning mechanism processes the training data and automatically detects patterns in the provided submissions. The machine learning mechanism automatically correlates these patterns with the scores or ratings assigned to the submissions that match those patterns. As a result, the machine learning mechanism is trained.

For example, the machine learning mechanism may automatically determine that, of the submissions that have been scored or rated "obscene," all of those submissions match a particular pattern that submissions that have not been scored or rated "obscene" do not match. Based, on this determination, the machine learning mechanism may store or refine an association between the particular pattern and the "obscene" score or rating.

Thereafter, the machine learning mechanism processes additional submissions that might not yet have been scored or rated. For each such submission, the machine learning mechanism automatically identifies, from among the patterns that the machine learning mechanism has already detected, one or more patterns that the submission matches. The machine learning mechanism automatically scores or rates these submissions based on the matching patterns and the scores or ratings that are associated with those patterns. The scores or ratings are indicative of the quality of the submissions.

For example, if, after the machine learning mechanism has been trained, the machine learning mechanism determines that a recently submitted submission matches the particular pattern that is associated with the "obscene" score or rating, then the machine learning mechanism may automatically assign the "obscene" score or rating to that submission. Thereafter, an operator may optionally examine the submission to determine whether the machine learning mechanism properly scored or rated the submission.

Additionally or alternatively, the machine learning mechanism may automatically perform, relative to the submission, a specified action that has been associated with the "obscene" score or rating. For example, the machine learning mechanism may automatically delete, from a database, all submissions that the machine learning mechanism scores or rates "obscene." Consequently, users of the question-and-answer submission system will not see such deleted submissions. As a result, the quality of the data upon which the question-and-answer submission system is based is automatically improved without undue human intervention.

Although embodiments of the invention are described in the context of a question-and-answer submission system, embodiments of the invention also may be applied to other social knowledge systems. For example, embodiments of the invention may be applied to user submissions made to an online bulletin board system. For another example, embodiments of the invention may be applied to user submissions made to an online auction system. For yet another example, embodiments of the invention may be applied to user submissions made to "encyclopedia" or "frequently asked questions" type systems in which a user submits a question and also provides the answer to that question for other members of the system's community to consult.

Example System

Figure 1:
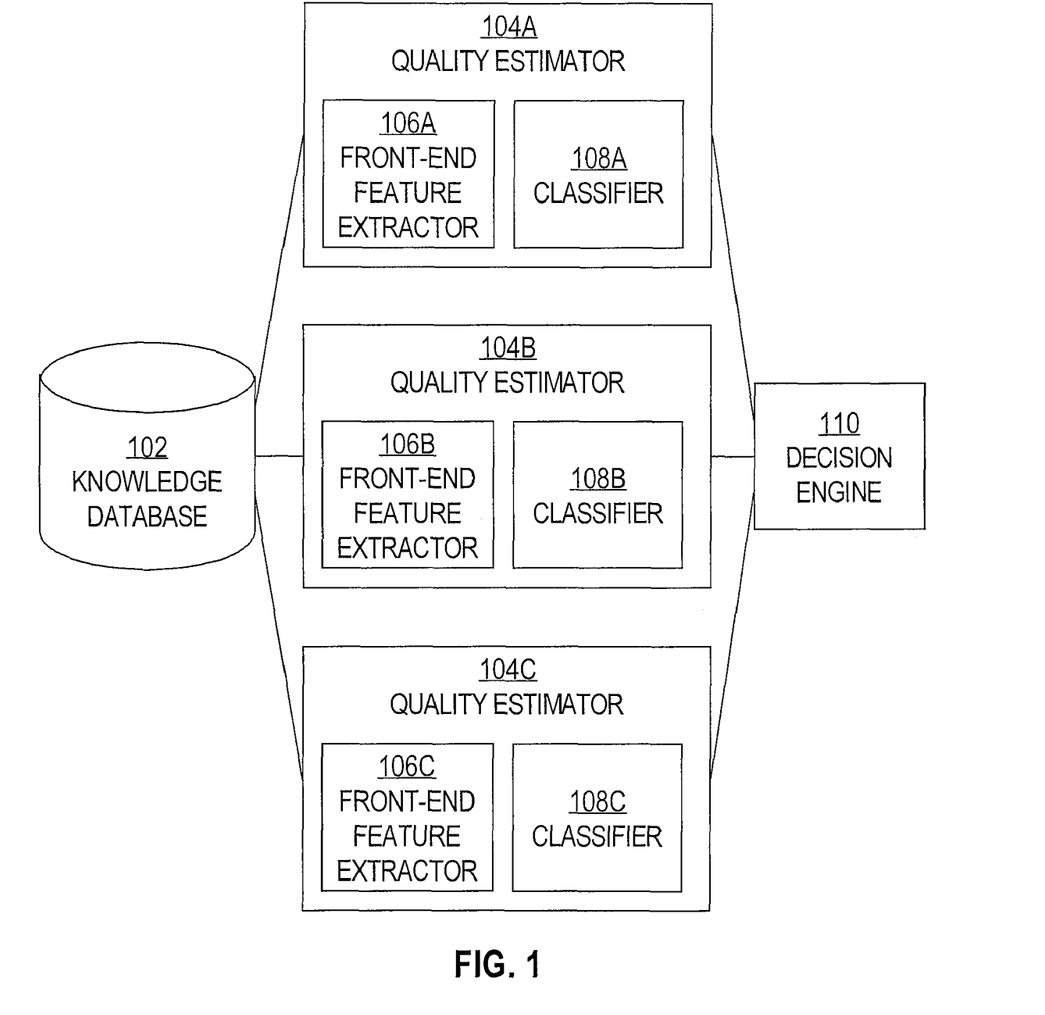
FIG. 1 depicts an example of a system in which an embodiment of the invention may be implemented.

FIG. 1 depicts an example of a system in which an embodiment of the invention may be implemented. The system of FIG. 1 includes a knowledge database 102, quality estimators 104A-C, and decision engine 110. Alternative embodiments of the invention may comprise more or fewer quality estimators than those shown. Submissions entered by submitters are stored in knowledge database 102. These submissions are processed by quality estimators 104A-C, which generate quality scores for the submissions, and stores the quality scores in knowledge database 102. The quality scores are associated, in knowledge database 102, with the submissions to which those scores pertain.

Quality estimators 104A-C comprise, respectively, front-end feature extractors 106A-C and classifiers 108A-C. Front-end feature extractors 106A-C and classifiers 108A-C may be implemented as separate processes, as a single process, or as separate thread of a single process. Front-end feature extractors 106A-C and classifiers 108A-C may be embodied in or execute on the same or on different machines such as the computer described below with reference to FIG. 3.

A submission might be composed of two parts: a question (part 1) and some additional information needed to clarify the question (part 2). Under such circumstances, quality estimator 104A might operate on part 1 of the submission (the question), and decision engine 110 can decide to stop and make a decision regarding the part's quality if decision engine 110 is sufficiently confident that the result of the decision will be reliable. If decision engine 110 cannot be sufficiently confident, then decision engine 110 may command quality estimator 104B to operate on part 2 of the submission. Decision engine 110 may then make a decision regarding the entire submission's quality based on the combined results of quality estimators 104A and 104B. Where multiple quality estimators are involved, decision engine 110 may attribute different weights to the separate results of the quality estimators in making decisions regarding submissions.

A further example of the operation of the components of FIG. 1 is described below.

Example Flow

Figure 2:
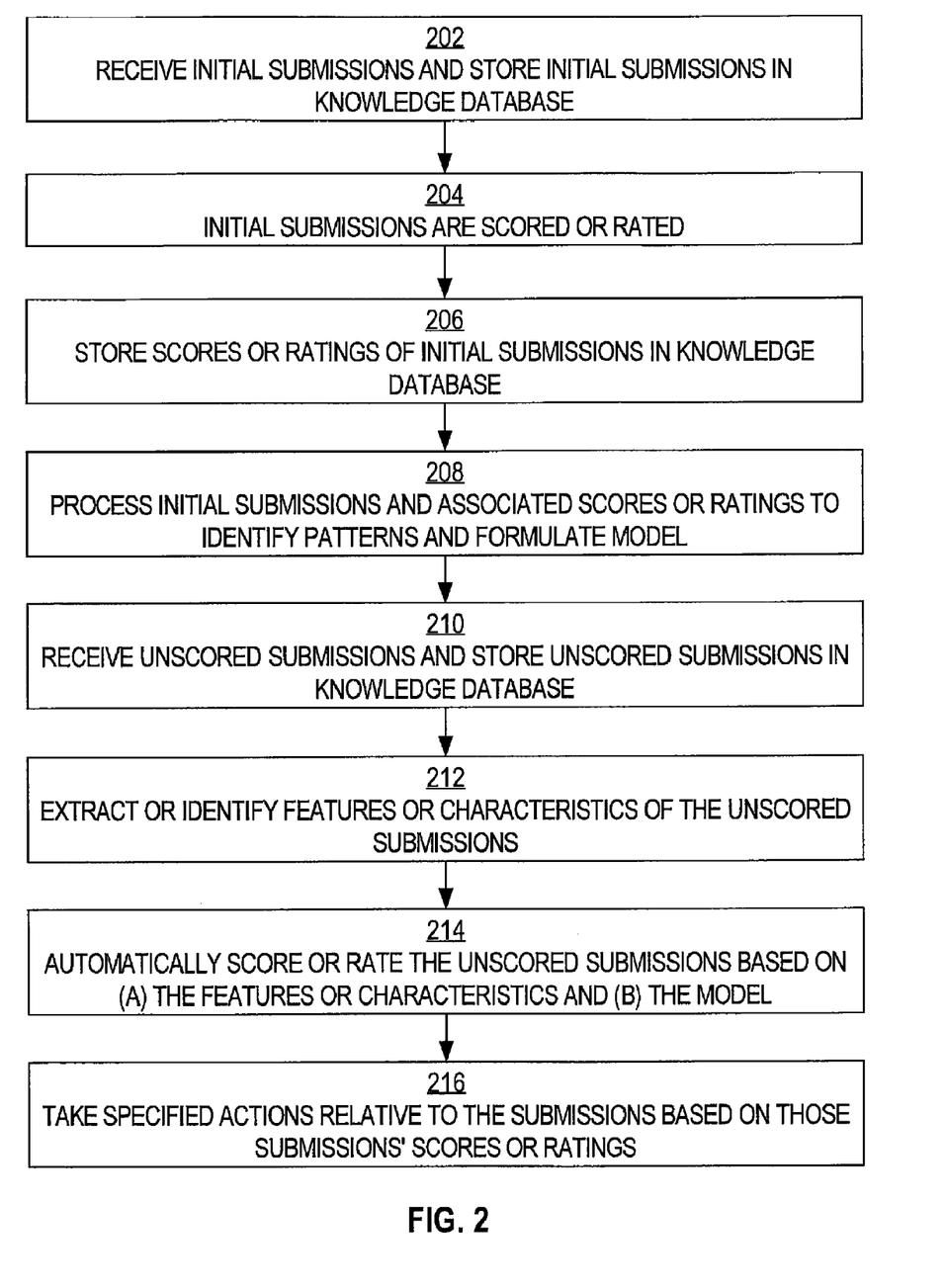
FIG. 2 depicts an example of a technique by which submissions may be automatically scored and acted upon using a machine learning mechanism, in accordance with an embodiment of the invention.

FIG. 2 depicts an example of a technique by which submissions may be automatically scored and acted upon using a machine learning mechanism, in accordance with an embodiment of the invention. Some examples of machine learning techniques which may be applied within various embodiments of the invention are described in *Machine Learning* by Tom Mitchell (McGraw Hill, 1997), which is incorporated by reference herein. For example, embodiments of the invention may employ supervised learning algorithms.

In block 202, initial submissions are received and stored in knowledge database 102. The initial submissions may be received from askers and answerers who submit such submissions to an online question-and-answer submission system, for example.

In block 204, the initial submissions are scored or rated. For example, human operators and/or automated algorithmic processes may score or rate the initial submissions based on some specified criteria. For example, based on the content of a particular submission, an operator might rate the particular submission "obscene" if the submission contains obscene subject matter, or "advertisement" if the submission contains an advertisement.

In block 206, the scores or ratings for the initial submissions are stored, in knowledge database 102, in association with the initial submission to which those scores or ratings pertain.

In block 208, classifier 108 processes the initial submissions and their associated scores or ratings to identify patterns within the initial submissions. The patterns may be based on the contents of the initial submissions, for example. Using machine learning techniques, classifier 108 automatically identifies such patterns and stores associations between those patterns and the scores or ratings that are associated with the submissions that match those patterns. Thus, classifier 108 is trained. The product of this training is a model.

If the operators and/or automated algorithmic processes have already taken actions relative to the initial submissions (e.g., removing some submissions from knowledge database 102), then, using machine learning techniques, decision engine 110 may process the submissions and the actions taken relative to those submissions to store associations between patterns and actions taken relative to submissions that match those patterns.

In block 210, unscored submissions are received and stored in knowledge database 102. The unscored submissions may be received from askers and answerers who submit such submissions to an online question-and-answer submission system, for example.

In block 212, front-end feature extractor 106 automatically extracts or identifies features or characteristics of the unscored submissions. For example, front-end feature extractor 106 may identify the number of misspelled words in the submissions and/or other features of the submissions, some of which are described in greater detail below.

In block 214, classifier 108 automatically scores or rates the unscored submissions, thereby producing scored submissions. Classifier 108 scores the submissions based on (a) the extracted features or characteristics of the submissions and (b) the model, which may include the previously identified patterns and the scores or ratings that are associated with those patterns. For example, based on the extracted features of a particular submission, classifier 108 may determine patterns that the features of the particular submission match, and score the particular submission based on the scores that are associated with those patterns.

In block 216, specified actions are taken relative to the scored submissions based on those submissions' scores or ratings. For example, decision engine 110 may automatically remove, from knowledge database 102, all submissions that have been scored or rated "obscene." For another example, decision engine 110 may penalize sufficiently low-scoring submissions by causing those submissions to appear lower within ordered lists of search results (e.g., Internet search engine search results) that include those submissions.

Penalizing Repetitively Offending Submitters

Over time, the automated mechanisms described herein may determine that a high proportion of a particular submitter's submissions have been negatively scored or rated. In one embodiment of the invention, when the proportion of a particular submitter's submitters that have received a negative score or rating (e.g., "obscene") is determined to have exceeded a specified threshold, an automated mechanism automatically takes a specified penalizing action relative to that submitter.

For example, in response to making such a determination, an automated mechanism may flag the submitter's account for further inspection by a human operator, relinquish the submitter's submission privileges, suspend the submitter's account for a specified period of time, remove all of the submitter's previous submissions, and/or remove the submitter's account entirely.

Scoring Submissions Based on Lexical Information

As quality estimator 104A receives scored submissions and learns to identify content within those submissions that probably influenced the scores that those submissions received, quality estimator 104A becomes better able to estimate, automatically, scores that unscored submissions should receive based on the contents of those submissions. For example, quality estimator 104A may learn that scored submissions which contain certain words (e.g., vulgar or slang words) or certain co-occurrences of words tend to have received higher or lower scores than submissions which did not contain those certain words or certain co-occurrences of words. For another example, quality estimator 104A may learn that scored submissions which contain certain abbreviated phrases (e.g., "LOL," "IMHO," "ROFL," "CUL8R," "IIRC," "AFAIK," etc.) tend to have received higher or lower scores than submissions which did not contain those certain abbreviated phrases. For yet another example, quality estimator 104A may learn that scored submission in which capitalization and/or punctuation have been used properly tend to have received higher or lower scores than submissions in which capitalization and/or punctuation have not been used properly. For yet another example, quality estimator 104A may learn that scored submissions which contain a higher quantity of misspelled words tend to have received higher or lower scores than submissions which contain a lower quantity of misspelled words. For yet another example, quality estimator 104A may learn that scored submissions which are more grammatically correct tend to have received higher or lower scores than submissions which are less grammatically correct. For yet another example, quality estimator 104A may learn that scored submissions which contain words of one particular length tend to have received higher or lower scores than submissions which contain words of another particular length.

Other lexical aspects of submissions that quality estimator 104A may examine in order to discover and learn correlations may include: character distribution entropy in a submission, word distribution entropy in a submission, word length distribution entropy in a submission, submission (i.e., sentence) length, lexical distance between submission text that potentially contains misspellings and corresponding reference text that does not contain misspellings, and/or the number of words in the submission that are absent from a dictionary of known words for a given language.

Quality estimator 104A may examine some or all of these lexical aspects of submissions in order to identify patterns and formulate a model. Based on automatically learned patterns involving such lexical information within the content of submissions, quality estimator 104A may automatically score as-of-yet unscored submissions so that those submissions receive scores similar to those received by other operator-scored or algorithmic-process-scored submissions that match similar lexical patterns.

Scoring Submissions Based on Web-Based Information Sources

In one embodiment of the invention, quality estimator 104A examines web-based sources of information in order to discover and learn correlations between submissions and scores. For example, quality estimator 104A may use information that is extracted from the analysis of search results that result from a web search query that was made with the submission. For example, quality estimator 104A may examine the number of "trusted" web sites in the first "N" search results. For another example, quality estimator 104A may examine information produced by a lexical analysis of the text that corresponds to the first "N" search results. For another example, quality estimator 104A may examine information produced from an expansion of a submission with lexical information that originates from the first "N" search results.

For another example, quality estimator 104A may examine information that was extracted from a search engine's analysis of search results that resulted from a web search query made with a submission. For example, quality estimator 104A might examine the number of "adult" sites occurring in the first "N" web results and/or the number of "spam" links occurring in the first "N" web results.

Scoring Submissions Based on Submitter Behavior

In one embodiment of the invention, submissions are automatically scored based on the contents of those submissions and the automatically learned manner in which other submissions with similar contents were scored. However, in one embodiment of the invention, the content of a submission is only one factor that goes into the automated scoring or rating of that content. In one embodiment of the invention, a submission is also scored based on the behavior of the submitter that submitted that submission.

In one embodiment of the invention, each submitter's behavioral characteristics are monitored and recorded. Behavioral characteristics include all observable characteristics pertaining to a submitter's interactions with the online question-and-answer submission system. For example, a submitter's behavioral characteristics may include the times of day at which the submitter interacts with the system, the frequency with which the submitter interacts with the system, the quantity of "virtual friends" (e.g., other users) with whom the submitter is formally associated in the system, the categories (e.g., "history" or "computer science") in which the submitter submits questions and/or answers, the quantity of categories in which the submitter submits questions and/or answers, the quantity of unique askers whose questions the submitter has answered, the quantity of questions that the submitter has asked and/or answered, the proportion of the submitter's answers that have been selected as best answers by askers, the scores that other users have assigned to the submitter's submissions, and/or the length of the submitter's submissions.

Submitters who submit submissions that acquire negative scores or ratings might tend to submit their submissions across a large quantity of categories (but not always). Similarly, submitters who submit submissions that acquire negative scores or ratings might tend to submit a large quantity of relatively short submissions (but not always). Using machine learning techniques, these tendencies can be identified automatically.

In one embodiment of the invention, a submitter's behavioral characteristics include characteristics of the submitter's behavior with regard to aspects of the Internet other than the online question-and-answer submission system. For example, in one embodiment of the invention, a submitter's behavioral characteristics include the URLs of the web pages that the submitted has previously visited with his Internet browser. In one embodiment of the invention, a tracking system keeps track of each such URL and stores it in association with the submitter's system account.

In one embodiment of the invention, quality estimator 104A is automatically trained, using machine learning techniques, to identify the more usually occurring characteristics of submitters that tend to submit submissions that have received certain scores or ratings. Through such training, quality estimator 104A can automatically predict that a submission, submitted by a submitter whose behavioral characteristics match a learned pattern, will deserve a score that is similar to the scores assigned to submissions submitted by the same or other submitters whose behavioral characteristics also matched that pattern.

Thus, in one embodiment of the invention, the score or rating that quality estimator 104A automatically assigns to a submission is based not only on the content of that submission, but also on the behavioral characteristics of the submitter that submitted that submission. In one embodiment of the invention, the patterns identified by the trained mechanisms are based on a combination of submitters' behavioral characteristics and submissions' content characteristics.

Scoring Submissions Based on Community Feedback

In one embodiment of the invention, users of the online question-and-answer submission system are permitted to rate or score questions and answers submitted by other users. Such ratings or scores may be numerical or otherwise. In one embodiment of the invention, for each question, the asker of that question is permitted to select, from among potentially many answers submitted for that question, a single best answer. An answer that has been selected as a best answer for a particular question is considered to have a very high rating as a submission.

In one embodiment of the invention, the score or rating given a submission by users other than the submitter of that submission is used as a factor in training the machine learning mechanisms. For example, quality estimator 104A may learn, based on training submissions provided to quality estimator 104A as input, that operator scored submissions that have received a particular score or range of scores from other users tend to receive a particular score or range of scores from the operators. When automatically determining a score or rating for a submission that has not yet been scored by an operator, quality estimator 104A may take in account any scores or ratings that the submission has received from other users of the online question-and-answer submission system. For example, quality estimator 104A may take into account whether a particular answer has been rated as a best answer.

Answers that have been rated as best answers might tend to receive higher scores from operators than answers that have not been so rated.

Rewarding Positive Submissions

As is described above, in one embodiment of the invention, submissions that have been scored in a negative way, such as by receiving a sufficiently low score or negative rating (e.g., "obscene" or "advertisement"), may have penalizing actions taken against them (e.g., removal from the knowledge database). However, not all actions taken relative to the submissions are necessarily penalizing actions.

In one embodiment of the invention, rewarding actions are taken relative to submissions that have been scored or rated in a positive way. For example, if a submission has received a score or rating that indicates that the submission is an especially high quality submission, then the submission may be rewarded. For example, an automated mechanism may reward a submission by promoting that submission's order in a list of submissions (e.g., answers to a particular question or an ordered/ranked list of search results). For another example, an automated mechanism may reward a submission by visually emphasizing the submission to visibly distinguish the submission from other submissions.

Routing Questions to Quality Answerers

In an online question-and-answer submission system, over time, the automatic scoring or rating mechanisms described above might score or rate a high proportion of a particular answerer's answers in a positive way. According to one embodiment of the invention, when the proportion of a particular answerer's answers that have received a sufficiently high score or rating exceeds a specified threshold, the particular answerer is automatically labeled as a "quality answerer." In one embodiment of the invention, actions are automatically taken in an effort to encourage quality answerers to answer more questions, thereby hopefully increasing the overall quality of the data in the knowledge database.

In one embodiment of the invention, whenever a new question is asked, that question is automatically routed to a quality answerer. Alternatively, a new question may be routed to a quality answerer in response to a determination that the question satisfies specified criteria. For example, a new question might be routed to a quality answerer if that question has been categorized as belonging to a category (e.g., "history") in which the quality answerer has previously expressed interest. Previous interest in a category may be inferred from the quality answerer's previous answering of at least a specified quantity of questions that belong to that category, and/or from a high proportion of the quality answerer's previous answers being answers to questions that belong to that category, for example.

In one embodiment of the invention, questions are automatically routed to a quality answerer by placing those questions, or links to those questions, in the quality answerer's "in box," which might be a part of or external to the online question-and-answer submission system. In one embodiment of the invention, questions are automatically routed to a quality answerer by displaying at least some of those questions, or portions thereof, on the quality answerer's customized home page (e.g., the web page which the quality answerer's Internet browser is configured to load when the quality answerer's Internet browser starts). In one embodiment of the invention, by clicking on a question or a link to that question, the quality answerer's browser is automatically directed to a web page that contains a form through which the quality answerer can submit an answer to that question.

Hardware Overview

Figure 3:
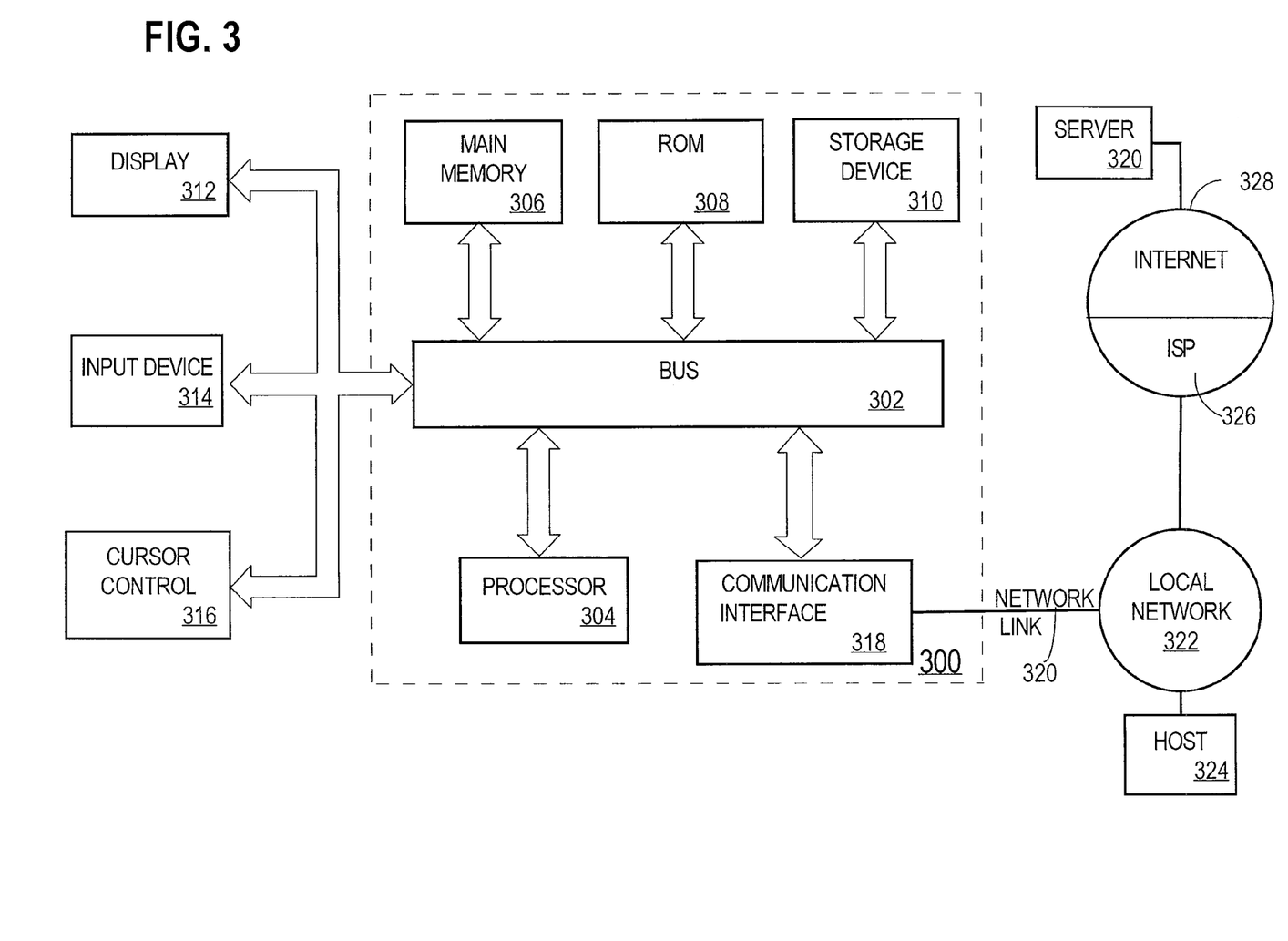
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
receiving one or more answer submissions at an online answer submission system that accepts, from multiple users, answers to questions submitted to the online answer submission system by users other than those that submitted the one or more answer submissions;
processing a set of previously scored training submissions, thereby training a machine learning mechanism to score, automatically, a plurality of submissions that are submitted by users of a system;
scoring a particular submission of said plurality of submissions automatically using the machine learning mechanism, thereby producing a score; and
performing, relative to the particular submission, an action that is determined based on said score;
wherein said previously scored training submissions are also answers to questions submitted to the online answer submission system;
wherein said steps are performed by one or more computing devices.

2. The method of claim 1, wherein processing the set of previously scored training submissions comprises automatically identifying, in the previously scored training submissions, co-occurrences of words that are correlated with the scores that one or more of the previously scored training submissions received.

3. The method of claim 1, wherein processing the set of previously scored training submissions comprises automatically identifying, in the previously scored training submissions, abbreviated phrases are correlated with the scores that one or more of the previously scored training submissions received.

4. The method of claim 1, wherein processing the set of previously scored training submissions comprises automatically identifying, in the previously scored training submissions, grammatical errors that are correlated with the scores that one or more of the previously scored training submissions received.

5. The method of claim 1, wherein processing the set of previously scored training submissions comprises automatically identifying one or more behavioral characteristics of submitters of the previously scored training submissions, wherein identifying the one or more behavioral characteristics comprises identifying one or more behavioral characteristics that are correlated with the scores that one or more of the previously scored training submissions received.

6. The method of claim 5, wherein identifying the one or more behavioral characteristics of submitters of the previously scored training submissions comprises automatically identifying, in Internet browsing histories of submitters of the previously scored training submissions, characteristics that are correlated with the scores that one or more of the previously scored training submissions received.

7. The method of claim 1, wherein processing the set of previously scored training submissions comprises automatically identifying question-asker-assigned ratings of one or more of the previously scored training submissions, wherein identifying the question-asker-assigned ratings comprises identifying question-asker-assigned ratings that are correlated with the scores that one or more of the previously scored training submissions received.

8. The method of claim 1, wherein performing the action based on the score comprises adjusting, based on the score, an order in which the particular submission will appear within an ordered list of submissions.

9. The method of claim 1, further comprising:
based on one or more scores that have been assigned to one or more submissions submitted by a particular submitter, classifying the particular submitter with a particular classification; and
based on the particular submitter being classified with the particular classification, presenting, to the particular submitter, one or more questions to which the submitter can submit answers.

10. The method of claim 1, wherein training the machine learning mechanism comprises training the machine learning mechanism based on at least one of: (a) character distribution entropy in a submission of the plurality of submissions, (b) word distribution entropy in a submission of the plurality of submissions, (c) word length distribution entropy in a submission of the plurality of submissions, (d) a length of a submission of the plurality of submissions, (e) lexical distance between submission text that contains misspellings and corresponding reference text that does not contain misspellings, and (f) a number of words in a submission of the plurality of submissions that are absent from a dictionary of known words for a specific language.

11. The method of claim 1, wherein training the machine learning mechanism comprises training the machine learning mechanism based on web-based sources of information, wherein the web-based sources of information comprise at least one of: (a) information that is extracted from an analysis of search results that result from a web search query, (b) a number of trusted web sites within a specified set of search results, (c) information produced by a lexical analysis of text that corresponds to a specified set of search results, and (d) information produced from an expansion of a submission with lexical information that originates from a specified set of search results.

12. The method of claim 1, wherein training the machine learning mechanism comprises training the machine learning mechanism based on information that was extracted from a search engine's analysis of search results that resulted from a web search query, wherein the information comprises at least one of: (a) a number of sites occurring within a specified set of search results that have been classified as adult sites, and (b) a number of links within a specified set of search results that have been classified as spam links.

13. A non-transitory volatile or non-volatile computer-readable medium that stores instructions which, when executed by one or more processors, cause the one or more processors to perform steps comprising:
receiving one or more answer submissions at an online answer submission system that accepts, from multiple users, answers to questions submitted to the online answer submission system by users other than those that submitted the one or more answer submissions;
processing a set of previously scored training submissions, thereby training a machine learning mechanism to score, automatically, a plurality of submissions that are submitted by users of a system;
scoring a particular submission of said plurality of submissions automatically using the machine learning mechanism, thereby producing a score; and
performing, relative to the particular submission, an action that is determined based on said score;
wherein said previously scored training submissions are also answers to questions submitted to the online answer submission system.

14. The computer-readable medium of claim 13, wherein processing the set of previously scored training submissions comprises automatically identifying, in the previously scored training submissions, co-occurrences of words that are correlated with the scores that one or more of the previously scored training submissions received.

15. The computer-readable medium of claim 13, wherein processing the set of previously scored training submissions comprises automatically identifying, in the previously scored training submissions, abbreviated phrases are correlated with the scores that one or more of the previously scored training submissions received.

16. The computer-readable medium of claim 13, wherein processing the set of previously scored training submissions comprises automatically identifying, in the previously scored training submissions, grammatical errors that are correlated with the scores that one or more of the previously scored training submissions received.

17. The computer-readable medium of claim 13, wherein processing the set of previously scored training submissions comprises automatically identifying one or more behavioral characteristics of submitters of the previously scored training submissions, wherein identifying the one or more behavioral characteristics comprises identifying one or more behavioral characteristics that are correlated with the scores that one or more of the previously scored training submissions received.

18. The computer-readable medium of claim 13, wherein identifying the one or more behavioral characteristics of submitters of the previously scored training submissions comprises automatically identifying, in Internet browsing histories of submitters of the previously scored training submissions, characteristics that are correlated with the scores that one or more of the previously scored training submissions received.

19. The computer-readable medium of claim 13, wherein processing the set of previously scored training submissions comprises automatically identifying question-asker-assigned ratings of one or more of the previously scored training submissions, wherein identifying the question-asker-assigned ratings comprises identifying question-asker-assigned ratings that are correlated with the scores that one or more of the previously scored training submissions received.

20. The computer-readable medium of claim 13, wherein training the machine learning mechanism comprises training the machine learning mechanism based on at least one of: (a) character distribution entropy in a submission of the plurality of submissions, (b) word distribution entropy in a submission of the plurality of submissions, (c) word length distribution entropy in a submission of the plurality of submissions, (d) a length of a submission of the plurality of submissions, (e) lexical distance between submission text that contains misspellings and corresponding reference text that does not contain misspellings, and (f) a number of words in a submission of the plurality of submissions that are absent from a dictionary of known words for a specific language.

* * * * *